(12) United States Patent
Shelton et al.

(10) Patent No.: US 6,332,594 B2
(45) Date of Patent: Dec. 25, 2001

(54) CABLE SUPPORTING DEVICE

(75) Inventors: Michael James Shelton, Greenfield; Randy Scott Baker, Shirley, both of IN (US); Keith William Boutillier, Cypress, CA (US); Brian William Rhodes, New Castle, IN (US)

(73) Assignee: Chatsworth Products, Inc., Chatsworth, CA (US)

( * ) Notice: Subject to any disclaimer, the term of this patent is extended or adjusted under 35 U.S.C. 154(b) by 0 days.

(21) Appl. No.: 09/769,643

(22) Filed: Jan. 25, 2001

Related U.S. Application Data

(62) Division of application No. 09/351,564, filed on Jul. 12, 1999.

(51) Int. Cl.[7] ........................................... F16L 3/08
(52) U.S. Cl. ........................... 248/65; 248/68.1; 248/73; 248/58
(58) Field of Search .................... 248/65, 58, 68.1, 248/73, 339, 304, 301, 317, 62, 302, 303

(56) References Cited

U.S. PATENT DOCUMENTS

| | | | |
|---|---|---|---|
| 840,009 | * 1/1907 | Peirce | 254/134.3 PA |
| 2,270,802 | 1/1942 | Kristensen | 248/301 |
| 3,074,676 | * 1/1963 | Watson | 248/71 |
| 4,013,253 | 3/1977 | Perrault et al. | 248/222.51 |
| 4,039,131 | 8/1977 | Perrault et al. | 248/73 |
| 4,709,888 | 12/1987 | Cubit et al. | 248/73 |
| 5,514,834 | * 5/1996 | Zimmerman | 174/48 |
| 5,740,994 | 4/1998 | Laughlin | 248/68.1 |
| 5,890,689 | * 4/1999 | Johnson | 248/208 |
| 5,961,081 | 10/1999 | Rinderer | 248/68.1 |

\* cited by examiner

*Primary Examiner*—Ramon O. Ramirez
*Assistant Examiner*—Holly N. Sy
(74) *Attorney, Agent, or Firm*—Kennedy Covington Lobdell & Hickman, LLP

(57) ABSTRACT

A device for supporting electrical cables and the like which includes a saddle for receiving and supporting the cables, and the saddles has a support surface formed with a rounded configuration that curves away from is centerline and downwardly from the centerline in both directions with a radius of curvature that provides a contour generally similar to the contour of the cables supported thereat.

2 Claims, 6 Drawing Sheets

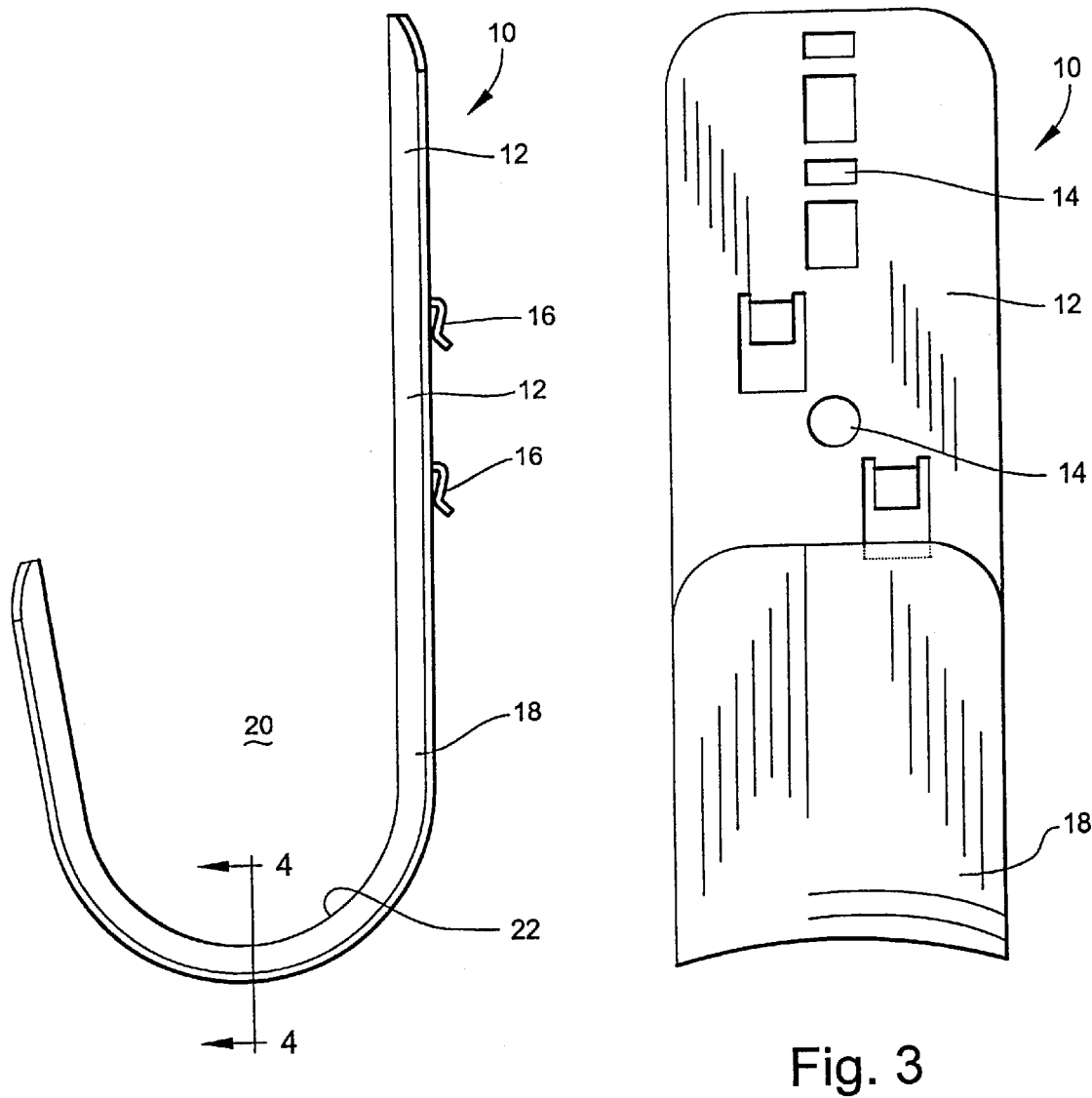
Fig. 2
Fig. 3
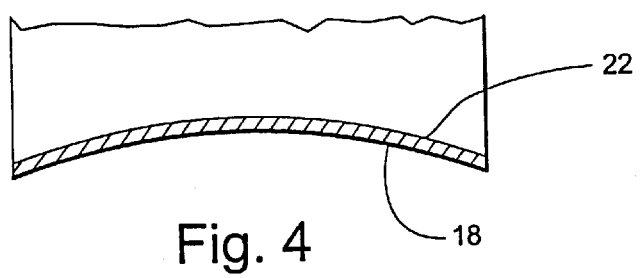
Fig. 4

CABLE SUPPORTING DEVICE

CROSS-REFERENCES TO RELATED APPLICATIONS

The present application is a divisional U.S. patent application claiming priority under 35 U.S.C. §120 from U.S. Patent application Ser. No.: 09/351,564, filed Jul. 12, 1999, herein incorporated by reference.

BACKGROUND OF THE INVENTION

The present invention relates generally to devices for supporting flexible electrical cables.

When electrical cables, such as data communication and power cables, extend over substantial distances, they must be properly supported at appropriately spaced intervals by some type of supporting device to avoid kinking, sharp bends, excessive sagging, and the like, that can cause damage to the cables and/or interfere with the transmission through the cables.

One known cable supporting bracket of this general type is disclosed in Perrault U.S. Pat. No. 4,039,131. This type of bracket has a "J" configuration and is generally referred to as "a J-Hook", and it includes a flat cable supporting surface formed with a curvature to contain the supported cable or cables, and a downwardly extending flange is provided at each outer edge of the flat cable supporting surface to strengthen the bracket. The corners between the flat supporting surface and the two downwardly extending flanges are rounded, and are intended to avoid exposing the supported cables to a sharp edge which might damage the cables.

Similarly, Laughlin U.S. Pat. No. 5,740,994 discloses a cable supporting bracket which also includes a flat cable supporting surface being formed with a curvature for containing the cable(s), and a stiffening or strengthening flange formed at each side edge of the flat supporting surface with rounded corners therebetween. However, in this bracket, the stiffening flanges extend downwardly and outwardly from the flat supporting surface at an angle of forty-five degrees, and this angle, combined with the rounded surface, also reduces the sharpness of the sharp corners or edges that might damage the supported cables.

While both of these known cable supports do reduce the sharpness of the edges, at least to some extent, they still present flat surfaces that extend in angular relationship to one another, and they still present an edge between the surfaces, all of which can result in the cables not being properly supported on a surface configuration that conforms to the curvature of the cables themselves.

Although these cable supports are mounted at spaced intervals from one another (e.g. 150 cm) to avoid excessive sagging of the cables, the weight of the cables nevertheless results in some sag between two adjacent cable supports, and this sag can result in the cable having a curvature at the points where it extends downwardly from both sides of the support brackets. Additionally, where the cable is somewhat stiff, it may assume a curvature as it extends over the flat supporting surface of the cable support, rather than lying flat on the flat support surface, and this lack of support, combined with the cable having to pass over the edges (albeit rounded edges) between the flat supporting surface and the flat stiffening flanges, can put undesirable stress on the supported cables.

Accordingly, there is a need for a cable supporting device which overcomes the aforesaid disadvantages of known devices of this type.

SUMMARY OF THE INVENTION

In accordance with the present invention, a device is provided for supporting flexible cables which comprises an attachment portion by which the device is attached to a mounting member, such attachment portion having a generally longitudinal extent and openings therein for receiving said mounting members, and a support portion formed integrally with the attachment portion at one of its longitudinal ends and extending therefrom along a centerline having a confining configuration that forms a saddle for containing the flexible cables. The support portion has a support surface formed with a rounded configuration that curves away and downwardly from the centerline in both directions with a radius of curvature that provides a contour generally similar to the contour of the flexible cables supported and contained within said saddle.

In one embodiment of the present invention, the centerline of the support portion has a curved configuration, and the support surface is formed with a rounded configuration that curves away and downwardly from said centerline in both directions with a constant radius of curvature. In another embodiment of the present invention, the support surface may be formed with a channel extending along the centerline of the saddle, the channel having a predetermined depth and having a bottom wall formed with a radius of curvature extending from the same center as said radius of curvature of the support surface. A strap is disposed within the channel for assisting in maintaining the cables within the saddle, such strap having a thickness corresponding to the depth of the channel whereby the contour of the top surface of the strap forms a curvature corresponding to the curvature of the major portion of the support surface and the top surfaces of the strap and the support surface form a continuous curved surface.

In yet another embodiment of the present invention, the configuration of the support portion is generally triangular, and includes a first leg extending downwardly and away from the attachment portion in angular relation thereto, a second leg extending from the first leg at an acute angle and generally perpendicular to the longitudinal extent of the attachment portion, and a third leg extending upwardly from the second leg at an acute angle. The second leg of the support portion has a support surface formed with a rounded configuration that curves away and downwardly from the centerline in both directions with a constant radius of curvature that provides a contour generally similar to the contour of the flexible cables supported and contained within the saddle.

BRIEF DESCRIPTION OF THE DRAWINGS

FIG. 2 is a side view of the cable support device illustrated in FIG. 1;

FIG. 3 is a front view of the cable support device illustrated in FIG. 1;

FIG. 4 is a cross-sectional view, taken on a vertical plane through the support surface of the cable device illustrated in FIG. 1;

BRIEF DESCRIPTION OF THE PREFERRED EMBODIMENTS

Figure 1:
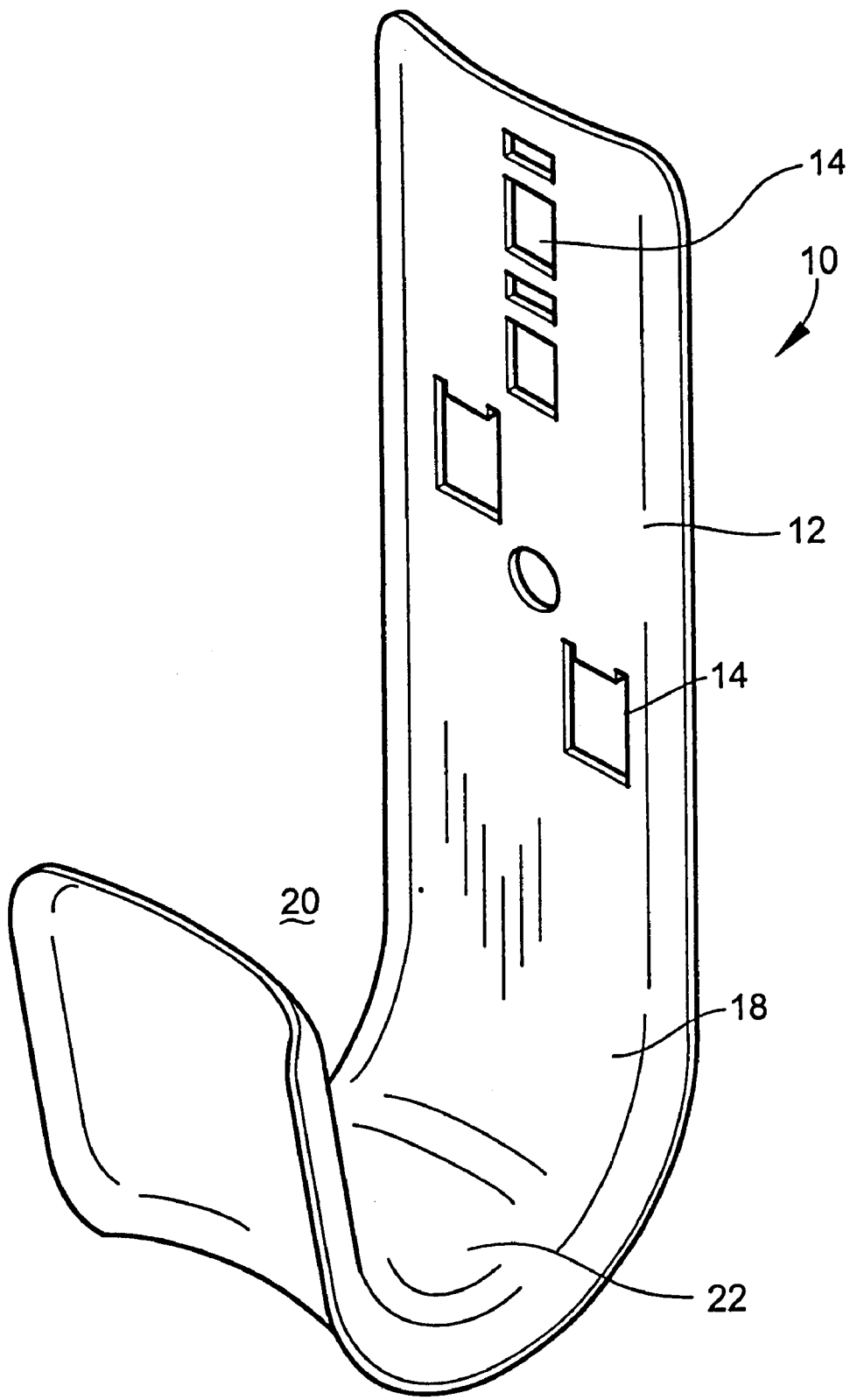
FIG. 1 is a perspective view of one embodiment of the cable support device of the present invention.

Looking now in greater detail at the accompanying drawings, FIGS. 1–4 illustrate one embodiment of a device for supporting flexible cables in accordance with the present invention. In this form of the invention, the device is a J-Hook 10 that includes an attachment portion 12 by which the device is attached to a mounting member, and this attachment portion 12 has a generally longitudinal extent and is formed with openings 14 that are designed to receive a variety of conventional mounting members, such as ceiling fasteners, drop wire clips, and vertically depending straps utilizing clips 16, two of which are illustrated in FIG. 2.

The J-Hook 10 also includes a support portion 18 that is formed integrally with the attachment portion 12 at the lower longitudinal end of the attached portion 12, and the support portion 18 extends therefrom along a centerline having a confining configuration that forms a saddle 20 for containing flexible electrical cables and the like as described above.

As best seen in FIG. 4, the support portion 18 is formed with a support surface 22 having a rounded configuration that curves away and downwardly from the center line of the support portion 18, in both directions. In the preferred embodiment of the present invention, this rounded configuration is formed with a radius of curvature that provides a contour generally similar to the contour of the flexible cables that are to be supported and contained within the saddle 20. Preferably, this radius of curvature is within the range of two inches to four inches.

Figure 10:
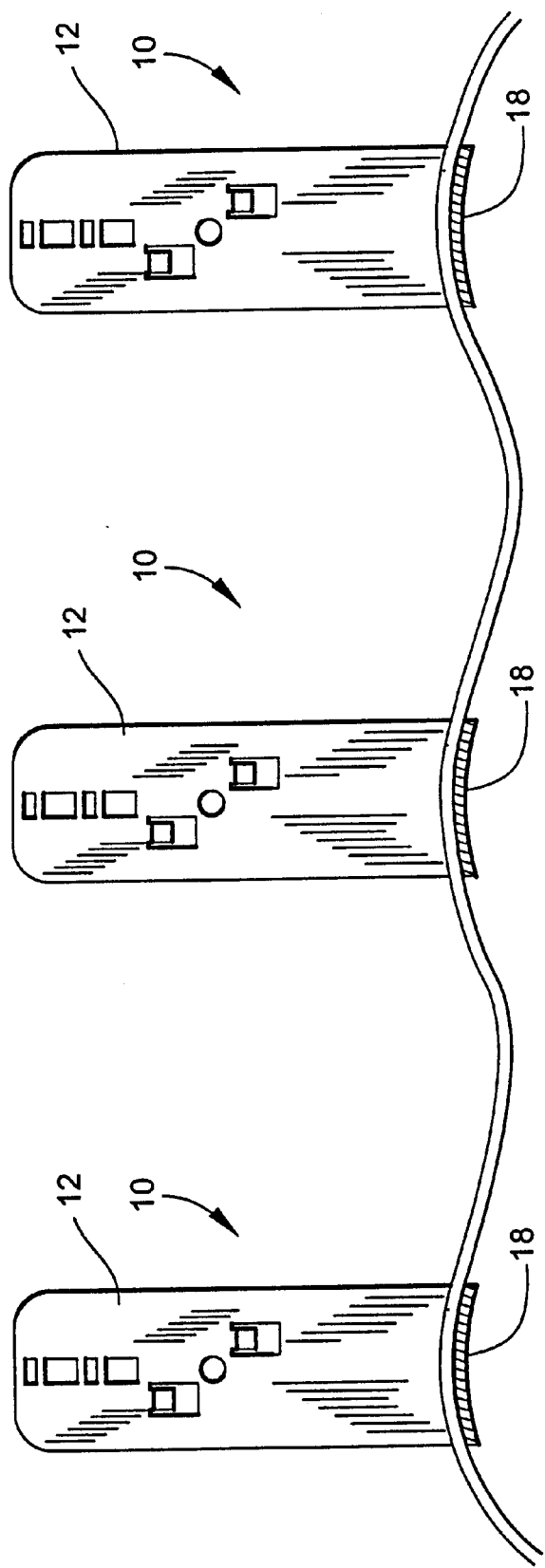
FIG. 10 is a diagrammatic view, illustrating several cable support devices of the present invention arranged at spaced locations and supporting an electrical cable.

By virtue of this unique configuration of the support portion 18 and support surface 22, the support surface 22 offers a full radius cross-sectional shape that provides cables with a smooth continuous surface on which the cables may lie, as best seen in FIG. 10. Thus, when a plurality of the J-Hooks 10 are mounted at spaced locations from one another, as generally suggested by industry standards, one or more electrical cables 24 are supported at the spaced locations by the J-Hooks 10. Because of the inherent weight of the electrical cables 24 and the spacing between the J-Hooks 10, there is some sag of the cables 24 between adjacent J-Hooks 10 as diagrammatically illustrated in FIG. 10, so that the electrical cables 24 assume a generally sinuous shape. This shape conforms nicely to the aforesaid curvature of the support surface 22 to provide a full, complete and continuous support for the cables 24 without the cables having to pass over sharp edges or having a curvature that leaves a portion of the electrical cable 24 unsupported.

This is in marked contrast to the known prior art supports of this type which, as described above, include a wide, flat center section on which the electrical cables are supported, and the flat center section is provided with rounded edges as disclosed in Perrault U.S. Pat. No. 4,039,131, or angled stiffening edges as disclosed in Laughlin U.S. Pat. No. 5,740,994.

Figure 5:
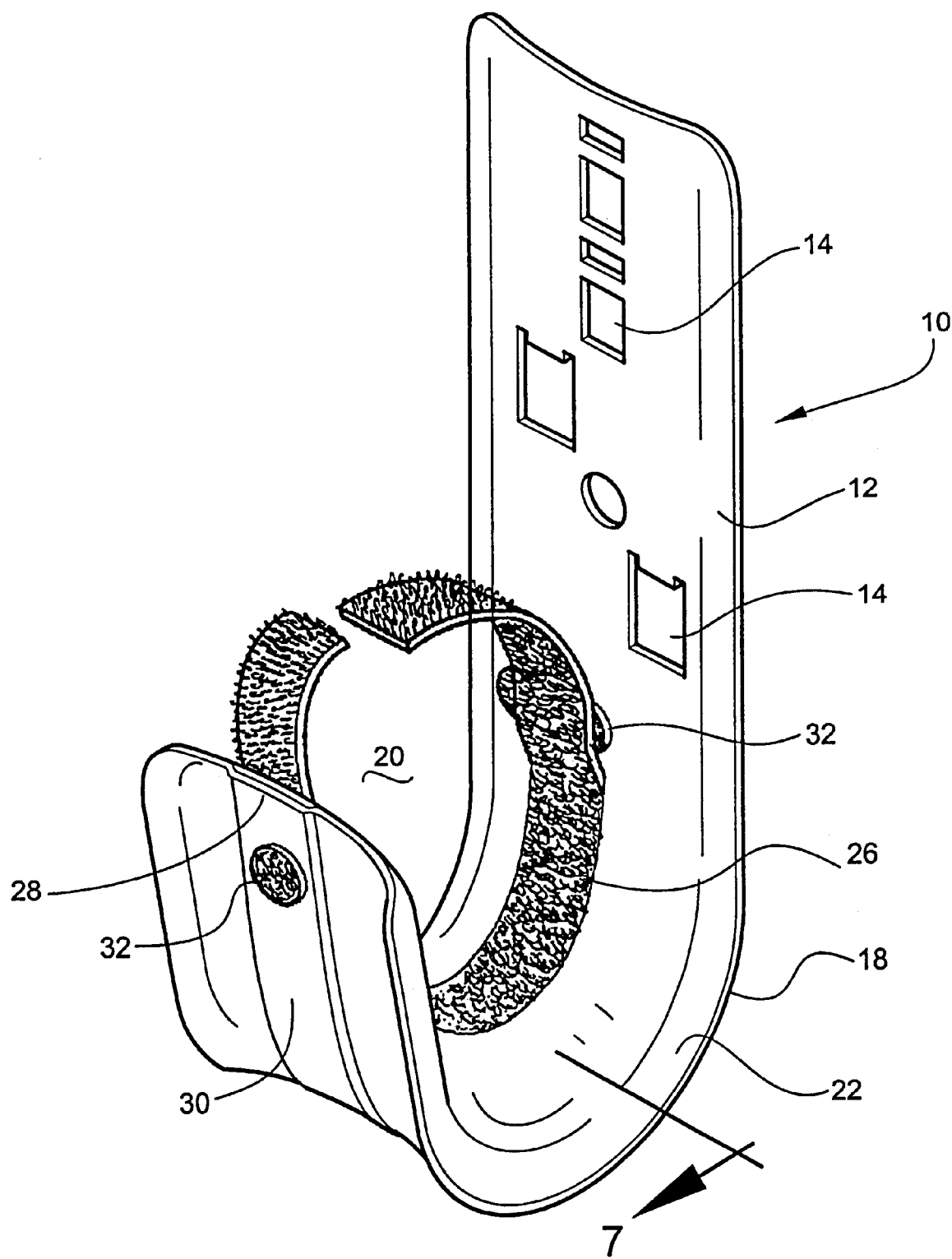
FIG. 5 is a perspective view of another embodiment of the cable support device of the present invention.
Figure 7:
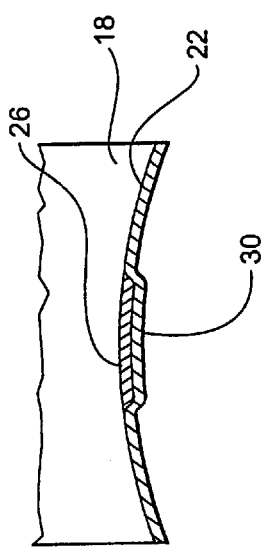
FIG. 7 is a cross-sectional view, taken on a vertical plane through the support surface of the cable device illustrated in FIG. 5
Figure 6:
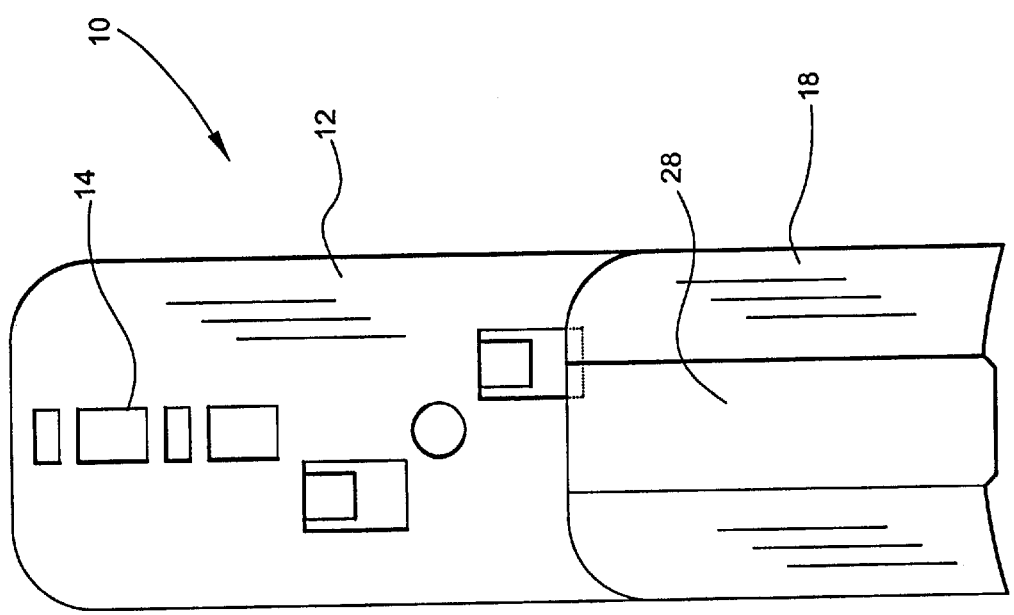
FIG. 6 is a front view of the cable support device illustrated in FIG. 5.

Another embodiment of the present invention is illustrated in FIGS. 5–7, which comprises a J-Hook that is identical to the J-Hook 10 described above in connection with FIGS. 1–4 except that a strap 26 is attached to the support portion 18 of the J-Hook 10 whereby the cables supported within the saddle 20 can be securely held in place by the strap 26.

More specifically, in this embodiment of the present invention, the support portion is formed with a channel 28 that extends along the center line of the support portion 18, and the strap 26 is mounted therein using rivets or any other conventional fastening device (not shown). As best seen in FIG. 6, the channel 28 has a bottom wall 30 that is formed with a radius of curvature extending from the same center as the aforesaid radius of curvature of the support surface 22. Also, the depth of the channel 28 corresponds to the thickness of the strap 26, and this depth, combined with the radius of curvature of the bottom wall 30, support the strap 26 so that the contour of the top surface of the strap 26 forms a curvature corresponding to the aforesaid curvature of the support surface 22. Accordingly, the upper surface of the strap 26 and the surface of the support portion 18 provide a smooth and continuous curved surface for properly supporting an electrical cable passing thereover.

Preferably, the strap 26 is formed at its extending ends with a conventional Velcro® hook-and-loop construction that permits the two end portions to be connected to each other at any desired location to hold electrical cables securely in place within the saddle 20. Also, in the preferred embodiment of the present invention, Velcro® spots 32 are mounted in the attachment portion 12 and on the outside surface of the support portion 18 as best illustrated in FIG. 5. When the strap 26 is not in use, the extending ends of the strap 26 can be temporarily secured to the two Velcro® spots 32 so that the extending ends of the strap 26 will be maintained at a position that will not interfere with the electrical cables as they are moved into and out of the saddle 20 of the J-Hook 10.

Figure 9:
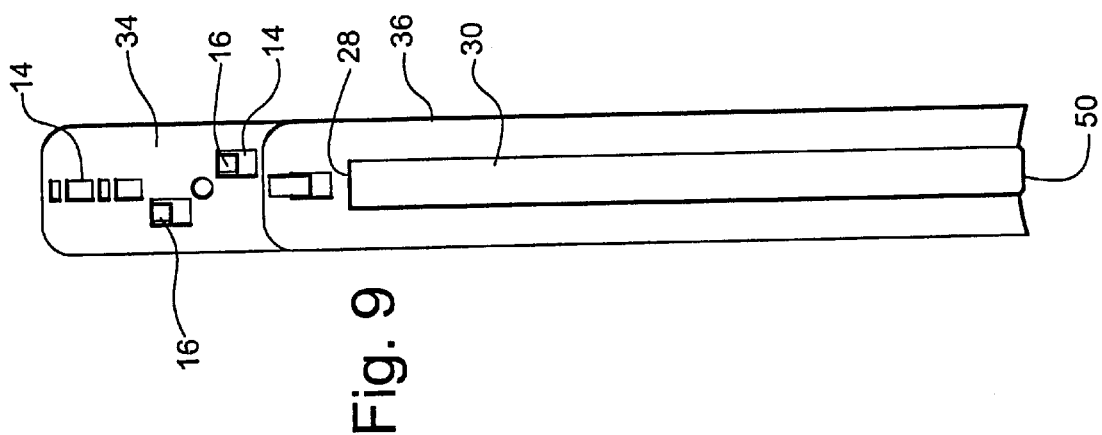
FIG. 9 is a front view of the cable support device illustrated in FIG. 8.
Figure 8:
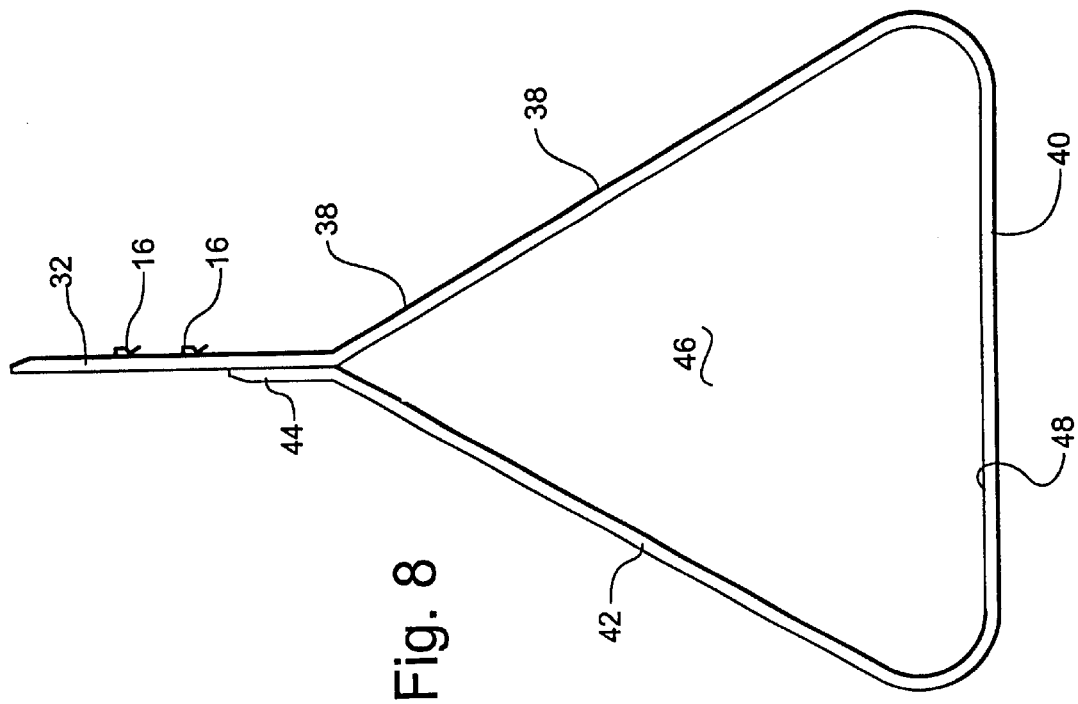
FIG. 8 is a perspective view of yet another embodiment of the cable support device of the present invention.

Another embodiment of the present invention is illustrated in FIGS. 8 and 9, and in this embodiment the cable supporting device also includes an attachment portion 34 by which the device is attached to mounting members as described above, and the attachment portion 34 has a generally longitudinal extent and is formed with openings for receiving mounting members of the aforesaid types. In this embodiment, the support portion 36 is also formed integrally with the attachment portion 34 and it has a generally triangular configuration which includes a first leg portion 38 that extends downwardly and away from the attachment portion 34 in angular relation thereto, a second leg portion 40 extending from the first leg portion 38 at an acute angle and in a direction generally perpendicular to the longitudinal extent of the attachment portion 34, and a third portion 42 that extends upwardly for the second leg portion 40 at an acute angle.

In the embodiment of the present invention illustrated in FIGS. 8 and 9, the third leg portion 42 is preferably formed at its upper extending end, with a flat flange 44. The support portion 36 is preferably formed of a metal that has a desired amount of resiliency so that the third leg portion 42 is normally biased to a position at which the flat flange 44 engages an adjacent surface of the attachment portion 34 to provide a closed saddle 46 to receive and support electrical cables therein. When it is desired to remove cables from the saddle 46, or place new cables therein, the third leg portion 42 can be moved against its bias to separate the flat flange 44 from the attachment portion 44 to provide an opening for loading or unloading cables within the saddle 46.

In this embodiment of the present invention, the support portion of 36 is formed with a support surface 48 that is identical to the support surface described in connection with the embodiments illustrated in FIGS. 1–7, and the support surface 48 may be formed with a smooth continuous surface which does not include any strap, in a manner identical to that described in connection with the embodiment illustrated in FIGS. 1–4 or, as illustrated in FIGS. 8 and 9, it can be formed with a channel 50 and a strap (not shown) that are, again, identical to the channel and strap described above in connection with the embodiment of the invention illustrated in FIGS. 5–7. In either case, electrical cables within the saddle 46 are supported on a smooth, continuous surface, having a radius of curvature that conforms to the curvature of the cables in the same manner as that described above.

It will therefore be readily understood by those persons skilled in the art that the present invention is susceptible of broad utility and application. Many embodiments and adaptions of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A device for supporting flexible cables, comprising:
   (a) an attachment portion by which the device is attached to a mounting member, said attachment portion having a generally longitudinal extent and openings therein for receiving said mounting members; and
   (b) a support portion formed integrally with said attachment portion at one longitudinal end of said support portion and extending therefrom along a centerline having a generally triangular configuration that includes a first leg extending downwardly and away from said attachment portion in angular relation thereto, a second leg extending from said first leg at an acute angle and generally perpendicular to said longitudinal extent of said attachment portion, and a third leg extending upwardly from said second leg at an acute angle, said second leg of said support portion having a support surface formed with a rounded configuration that curves away and downwardly from said centerline in both directions with a constant radius of curvature that provides a contour generally similar to the contour of the flexible cables supported and contained within said saddle.

2. A device for supporting flexible cables, comprising:
   (a) an attachment portion by which the device is attached to a mounting member, said attachment portion having a generally longitudinal extent and openings therein for receiving said mounting members; and
   (b) a support portion formed integrally with said attachment portion at one longitudinal end of said support portion and extending therefrom along a centerline having a confining configuration that forms a saddle for containing said flexible cables, said support portion having a support surface formed with a rounded configuration that curves away and downwardly from said centerline in both directions with a radius of curvature that provides a contour generally similar to the contour of the flexible cables supported and contained within said saddle, said confining configuration of said support portion being generally triangular and including a first leg extending downwardly and away from said attachment portion in angular relation thereto, a second leg extending from said first leg at an acute angle and generally perpendicular to said longitudinal extent of said attachment portion, and a third leg extending upwardly from said second leg at an acute angle.

* * * * *